March 22, 1966 A. MACKENZIE ET AL 3,242,337
APPARATUS FOR SENSING THE DECAY RATE OF
RADIO-ACTIVE MATERIALS
Filed March 20, 1963 2 Sheets-Sheet 2

United States Patent Office 3,242,337
Patented Mar. 22, 1966

3,242,337
APPARATUS FOR SENSING THE DECAY RATE OF RADIO-ACTIVE MATERIALS
Alasdair Mackenzie, Currie, Midlothian, and Neil M. Sutherland, Edinburgh, Scotland, assignors to United Kingdom Atomic Energy Authority, London, England
Filed Mar. 20, 1963, Ser. No. 266,609
Claims priority, application Great Britain, July 30, 1962, 29,156/62
6 Claims. (Cl. 250—83.3)

The present invention relates to apparatus for measuring the rate of radioactive decay of samples containing radioactive components.

A general object of the invention is to provide this sort of apparatus in a form capable of repetitive testing of samples.

A more specific object of the invention is to provide such apparatus in a form suitable for use in carrying out the method of fission product detection set forth in French Patent No. 1,313,498, wherein it is a part of the method to measure the radioactivity decay date of an isolated sample of the suspect fluid in respect of radiation energies in the range 1.5 to 6 mev. The requirement in this case is that fission products are detected in a stream of fluid which has passed over sealingly encased nuclear fuel undergoing neutron irradiation in a nuclear reactor.

This specific object is common to the pending application Serial No. 266,604 of even date by Deans and Harrington and of common assignee, and in the following particular examples by which the invention will be described only such parts are described and illustrated as are thought a necessary supplement for a complete understanding of the arrangements involved and their modes of operation.

Figure 1:
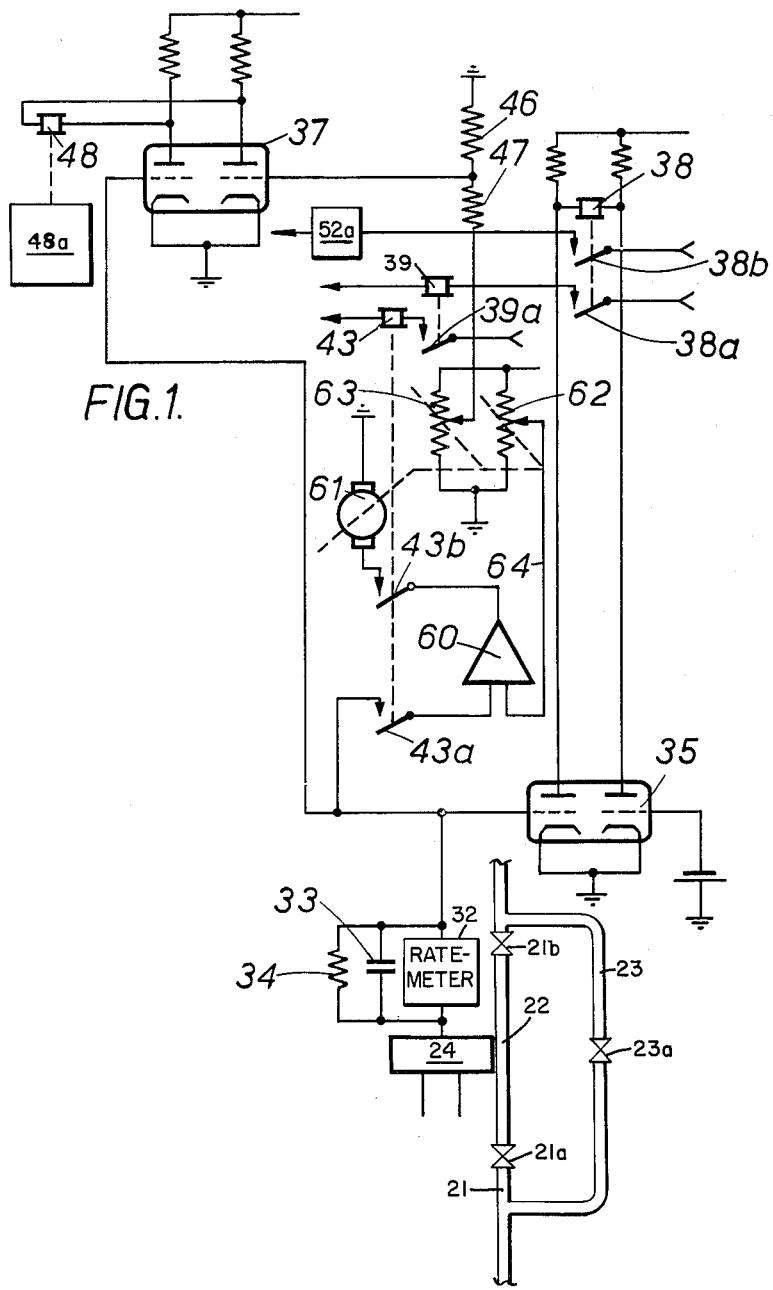
Figure 2:
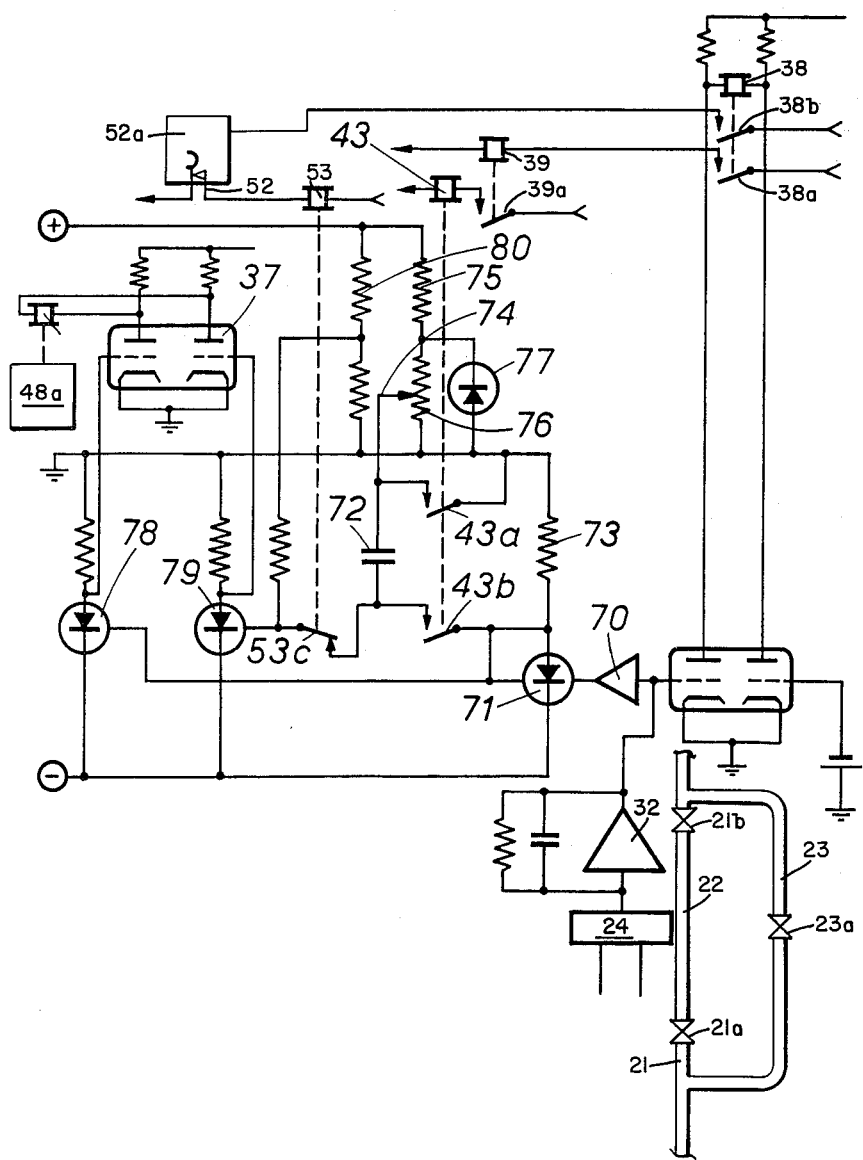

FIGURE 1 illsutrates schematically an embodiment of the invention where storage is accomplished electro-magnetically; and FIGURE 2 illustrates schematically a modification wherein storage is carried out by a capacitor.

The Frence patent and the copending application both describe an apparatus comprising two branch pipes in parallel. One branch pipe 21 includes two valves 21a and 21b operable simultaneously to isolate a sample of fluid flowing along said one branch pipe in a sample chamber 22 formed by the branch pipe 21 between the two valves 21a and 21b. The other branch pipe 23 includes a further valve 23a operable synchronously with the said two valves to permit the flow of fluid to by-pass said one branch pipe 21 through said other branch pipe 23 when a sample is sealed off in said sample chamber 22. A radiation measuring device 24 is disposed to sense the level of radiation in the chamber 22 and this is connected to a ratemeter 32.

In the example of FIGURE 1, connections from the output terminal of the ratemeter 32, of which the time constant is indicated separately by the capacitance 33 and the resistance 34, are made on the one hand to a first comparison circuit based on the double triode valve 35 and on the other hand to a D.C. summing amplifier 60 over the make contact 43a of the relay 43, this relay being energisable by the energisation of the relay 38 which by means of the first of its two make contacts 38a and 38b causes the energizing circuit of the relay 43 to be completed through a time delay element or timing means taking the form of the slow release relay 39 with a make contact 39a in the energizing circuit.

The single output terminal of the summing amplifier 60 is connected over the second make contact 43b of the relay 43 to drive a D.C. servo motor 61 which is arranged to drive the ganged sliders or tappings of two potentiometers 62 and 63 disposed in parallel between a controlled positive potential and ground. The slider of the potentiometer 62 has a feed back connection 64 to the summing amplifier and the arrangement is such that an error signal amounting to the difference between the potentials of the ratemeter and the feed back connection is amplified by the amplifier and acts to drive the servo motor in the sense to reduce the error; this arrangement therefore constitutes a null-seeking closed loop servo system which gives at the slider of the potentiometer 63 a voltage equal to the ratemeter output voltage. This slider is connected to the resistance divider network 46, 47 by means of which only half of the slider voltage is applied to the respective grid of the double triode valve 37 forming the basis of the second comparison circuit, the other grid of this valve having direct connection to the ratemeter output terminal.

Assuming all the relays to be energized initially, the null-seeking servo system establishes a voltage equal to the ratemeter output at the slider or tapping of the potentiometer 63 so that at the right hand grip of the triode valve 37 the voltage will be about half the voltage at the left hand grid and hence the associated relay 48 will also be energized.

When the ratemeter output rises sufficiently to cause de-energization of the relay 38, the consequent opening of the contact 38b initiates immediately the timing of the predetermined period by a clock motor 52a but only after the five second delay on the release of the relay 39 is the connection of the servo system with the ratemeter interrupted by the opening of the contacts 43a and 43b. Consequently, the voltage reproduced as a stored value at the slider of the potentiometer 63 corresponds to a stable value of the ratemeter output. At the double triode valve 37, half this value is compared with the presently falling ratemeter output which on becoming equal with a half-value causes the relay 48 to de-energize and thereby actuates an indicator means 48a to give the signal that this condition has been reached. Whether the half-life is long or short is indicated respectively by whether this signal occurs before or after the completion of the predetermined period timed by the clock motor.

In the example just described, storage is accomplished electro-mechanically, this being in contrast to the next example illustrated in FIGURE 2 wherein the storage means comprises a capacitor. Furthermore, in this next example, the ratemeter 32 is a logarithmic instrument as distinct from the linear instrument of FIGURE 1 so that for half-life measurement it is necessary to determine the time taken for the voltage output to fall by a constant amount, namely $K \log 2$, where $K$ is a constant determined by the logarithmic ratemeter and amplifier gains, etc., and is the voltage per decade of the ratemeter.

The logarithmic ratemeter 32 is connected through a D.C. amplifier 70 to the base of a transistor 71 connected as an emitter follower for supplying charging current at low impedance to the storage capacitor 72 over the make contacts 43a and 43b of the relay 43. with the resistances 75, 76 that on opening of the con-resistor 73 is reproduced across the storage capacitor.

In parallel with the connection to the capacitor over the contact 43a is a connection to a tapping 74 on a resistance divider network 75, 76 which has a zener diode 77 in a connection from its intermediate point to earth in order to maintain a fixed stable voltage across the resistance 75. The tapping 74 is so set in conjunction with the resistances 75, 76 that on opening of the contacts 43a and 43b the voltage across the storage capacitor is reduced by the fixed decrement corresponding to $K$ log 2. To ensure there is no tendency for charging of the capacitor through the resistance 76, the contacts of the relay 43 are adjusted so that the contact 43b opens slightly before contact 43a.

By means of a second emitter follower constituted by a transistor 78 the ratemeter output as reproduced at the emitter of the transistor 71 is applied continuously to the left hand grid of the double triode valve 37. The right hand grid is fed by a third emitter follower constituted by a transistor 79 the base of which can be connected to the storage capacitor over a break contact 53c of the relay 53, this relay being in series with the break contacts 52 of a clock motor 52a which are opened automatically when the motor has completed the predetermined period. The base of the transistor 79 is also connected to a resistance divider network indicated generally 80 which provides a base biassing voltage to render the transistor 79 non-conducting when the contact 53c is open.

From the preceding description, it will be evident that on de-energization of the relay 43, as in the previous example, the capacitor 72 stores a voltage corresponding to the logarithm of half the ratemeter output at that time. However, since the relay 53 remains energized until the contacts 52 open, it is only at the end of the predetermined period that this stored value is applied over the contact 53c and through the transistor 79 to the double triode valve 37 for comparison with the prevailing ratemeter output. Whether the half-life is long or short is indicated respectively by whether the relay 48 remains energized or is de-energized at this stage. Associated with the relay 48 is a suitable indicator means 48a.

In the example of FIGURE 2 it will be appreciated that the storage capacitor is isolated during the predetermined period from the double triode valve 37 and the transistor 79 with its base resistance 80 thereby eliminating a source of leakage loss. To reduce inherent leakage, the capacitor should have high insulation resistance; suitably it is a polystyrene capacitor. With transistors the D.C. amplifier does not need to be of a high gain type.

What we claim is:

1. In an apparatus for insertion in a flow path to sense the half life of radio-active materials, the apparatus including a sample chamber, means for isolating a sample admitted into the chamber and permitting the flow to continue past the chamber, and a decay rate sensing means, said decay rate sensing means comprising electrical means for comparing electrical values applied respectively at first and second inputs thereof, a radiation measuring device connected to said comparing means so as to apply at said first input an electrical output of which the magnitude is representative of a logarithmic scale of the radioactivity of a sample isolated in said chamber, means responsive to said radiation measuring device for timing a predetermined delay following isolation of the sample, electrical storage means connected to said comparing means for applying at said second input the instantaneous output, less a fixed decrement, of the radiation measuring device when said delay expires, and means actuated by said comparing means for providing a signal indicative of the relationship between the values at said first and second inputs.

2. The decay rate sensing means according to claim 1 wherein said fixed decrement is equivalent to 2 on the logarithmic scale applicable to the measuring device.

3. In an apparatus for insertion in a flow path to sense the half life of radioactive materials, the apparatus including a sample chamber, means for isolating a sample admitted into the chamber and permitting the flow to continue past the chamber, and decay rate sensing means, said decay rate sensing means comprising electrical means for comparing electrical values applied respectively at first and second inputs thereof, a radiation measuring device connected to said comparing means for applying at said first input an electrical output which is representative by its magnitude of the radioactivity of a sample isolated in said chamber, a timing means for timing a predetermined delay following isolation of the sample, an electrical storage means adapted at the end of said delay to store an electrical value dependent on the instantaneous output of the radiation measuring device, electrical contacts over which to apply selectively to said second input the electrical value stored in said storage means, and means actuated by the comparison means for providing a signal indicative of the relationship between the values applied at said first and second inputs.

4. The decay rate sensing means according to claim 3 and further comprising a second timing means adapted to time a period of preset duration following isolation of the sample, and an indicating means having two indicating states to one of which it is actuated if a signal occurs and to the other of which it is actuated if a signal does not occur on completion of the timed period, said electrical contacts being closed in response to completion of said period and said means actuated by the comparison means being adapted to give said signal if a preselected relationship pertains between the values at the first and second inputs.

5. In an apparatus for insertion in a flow path to sense the half life of radioactive materials, the apparatus including a sample chamber, means for isolating a sample admitted into the chamber and permitting the flow to continue past the chamber, and a decay rate sensing means, said decay rate sensing means comprising electrical means for comparing electrical values applied respectively at first and second inputs thereof, a radiation measuring device connected to said comparing means for applying at said first input an electrical output which is representative by its magnitude of the radioactivity of a sample isolated in said chamber, adjustable means for regulating an electrical supply applied to said second input, a null-seeking closed loop servo system adapted to be driven by said output and to adjust said adjustable means for regulating the supply applied at said second input in dependence upon said output electrical contacts for disconnection of said output from the servo system, timing means responsive to isolation of the sample for causing after a predetermined delay the disconnecting operation of said contacts, and means actuated by said comparison means for providing a signal indicative of the relationship between the values at the first and second inputs.

6. The decay rate sensing means according to claim 5 wherein said adjustable means is a potentiometer.

References Cited by the Examiner

UNITED STATES PATENTS

| 2,684,479 | 7/1954 | Hill | 317—149 |
| 2,751,494 | 7/1956 | Gray | 330—69 |
| 2,924,718 | 2/1960 | Packard | 250—106 |
| 3,084,251 | 4/1963 | Goupil | 250—71.5 |

FOREIGN PATENTS 724,441   2/1955   Great Britain.

RALPH G. NILSON, *Primary Examiner.*

JAMES W. LAWRENCE, *Examiner.*